March 1, 1966
O. C. KROLOPP
3,237,707
BROAD BAND INDICATOR
Filed Jan. 23, 1964
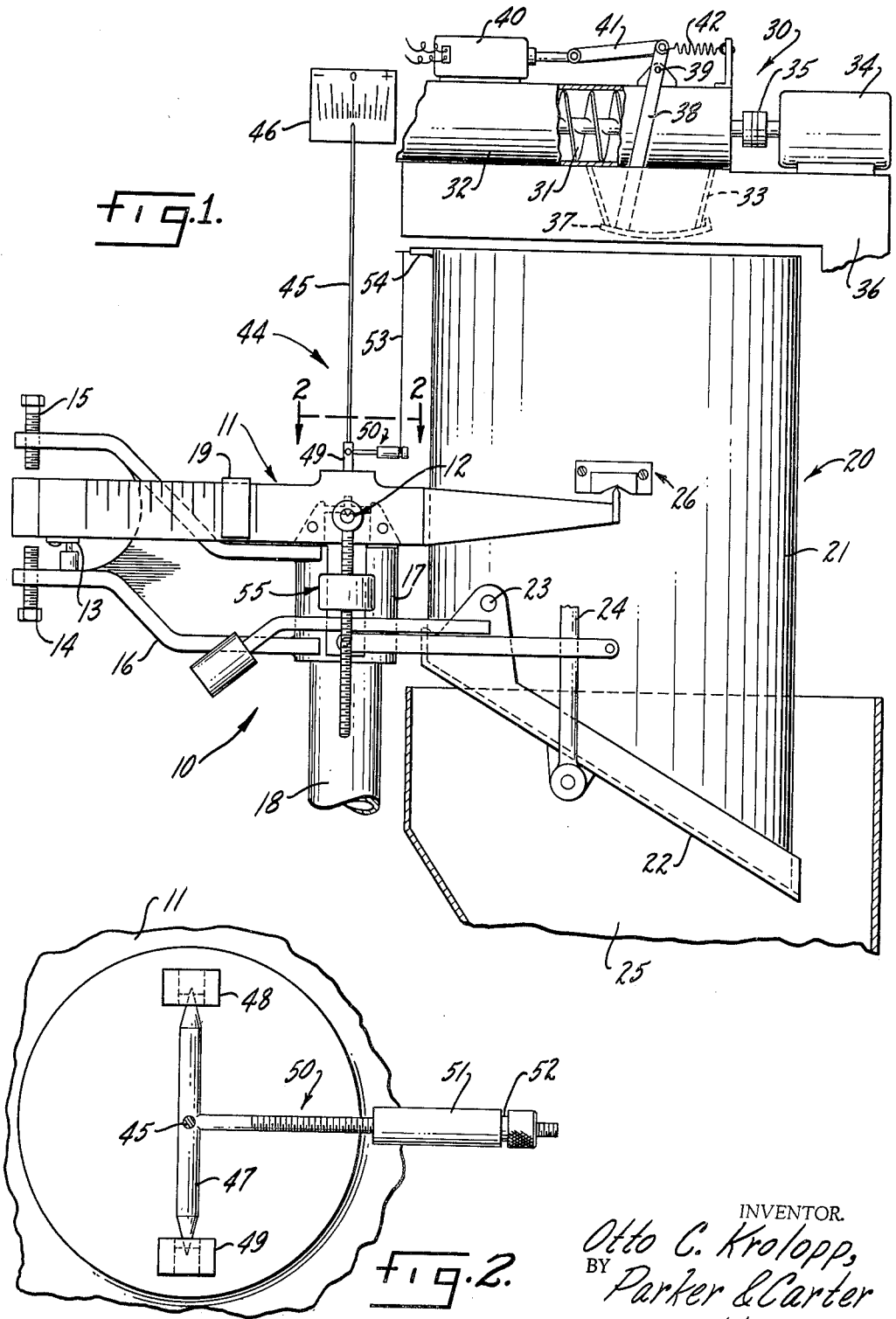
INVENTOR.
Otto C. Krolopp,
BY Parker &Carter
Attorneys.

United States Patent Office 3,237,707
Patented Mar. 1, 1966

3,237,707
BROAD BAND INDICATOR
Otto Charles Krolopp, Villa Park, Ill., assignor, by mesne assignments, to Blaw-Knox Company, Pittsburgh, Pa., a corporation of Delaware
Filed Jan. 23, 1964, Ser. No. 339,716
7 Claims. (Cl. 177—246)

This invention relates to the art of weighing and specifically to a balance indicator assembly usable with a beam type weigher. The invention is especially adapted for use in the automatic net weigher disclosed in copending application Serial No. 218,736, assigned to the assignee of the present application.

Weighers, and particularly automatic net weighers of the type illustrated in the aforementioned copending application, may be employed to weigh batches which vary widely in size and weight tolerance. Experience has shown that such a weigher is extremely efficient and in many respects far superior to anything known heretofore in the art. It occasionally happens however that an operator as a practical matter has some difficulty in determining the true balance of a weight when extremely small batches of material, for example on the order of a few ounces, are being weighed. This difficulty stem primarily from the limited travel of either the weigh beam or the conventional balance indicator generally employed with this type of weigher. In addition some slight difficulty is occasionally encountered when checking weights during a run, even though the initial setting has been made accurately.

Accordingly, the primary object of the invention is to provide a balance indicator in which even slight variations from a desired weight setting may be quickly and visually determined.

Another object is to provide a balance indicator assembly as above described for use in a weigher having a weigh beam which traverses a relatively limited path of movement.

Another object is to provide a balance indicator assembly usable in many types of weighers, including a net weigher, in which the weights may be checked occasionally even during a weighing run.

Another object is to provide a balance indicator assembly which may be made integral with the weighing system.

Yet a further object is to provide a balance indicator assembly, which, though made integral with the weighing system, has an exteremly high accuracy.

Yet a further object is to provide a balance indicator assembly usable with many types of weighing apparatus which is simple and inexpensive to manufacture and operate, very accurate, and easily read.

Other objects and advantages will become clear from a reading of the following description of the invention.

The invention is illustrated more or less diagrammatically in the accompanying drawings wherein;

FIGURE 1 is a side elevational view of one embodiment of the invention; and

FIGURE 2 is a view taken substantially along the line 2—2 of FIGURE 1 to an enlarged scale.

Like reference numerals will be used to refer to like parts throughout the following description of the drawing.

The weigh beam portion of an automatic net weigher is indicated generally at 10 in FIGURE 1. Although an automatic net weigher of the type illustrated in the aforementioned copending application has been chosen for purposes of illustration it will be understood that the invention is applicable to many types of weighers, and the illustrated weigher is merely exemplary.

The weigh beam portion includes a weigh beam 11 which is pivoted on a conventional knife-edged pivot indicated generally at 12. The left end of the weigh beam is shown resting upon a releasable stop 13. When the stop is moved out of the vertical path of travel of the weigh beam, adjustable limit stops 14 and 15 define the limit of travel of the weigh beam. The adjustable stops are received in threaded apertures in bracket 16 which in turn is welded to a collar 17. The collar may be slidably or fixedly mounted to a post or frame member 18. For a further description of the details of the post construction and weigh beam support means, reference is made to the aforesaid copending application.

A weighing receptacle is indicated at 20. The receptacle in this instance is a solid walled weigh bucket 21 to which a bottom gate 22 is pivotally connected as at 23. Suitable linkage 24 controls the opening and closing of gate 22. A discharge chute funnel is indicated at 25.

The weigh bucket 21 is supported on the right end of weigh beam 11 by knife-edged pivots 26.

Material to be weighed is admitted to the weigh bucket by the feeding mechanism indicated generally at 30. The feeding mechanism includes, in this instance and purely by way of example, a screw conveyor 31 rotatable in a closed housing 32 which discharges into a chute 33 aligned with and positioned above the open end of weigh bucket 21. The screw conveyor is controlled by suitable motor means 34 and power shafting 35 mounted on framework 36. The opening and closing of gate 37 is controlled by lever 38 which is pivoted as at 39 to the conveyor housing 32. Solenoid 40 and linkage 41 moves the gate in one direction and return spring 42 moves the gate in the other direction.

It should be understood that the above described feeding mechanism is illustrative only, as many types of feeding mechanisms may be used with the present invention.

The balance indicator assembly 44 includes an elongated reading indicator 45 whose upper end overlies a reading scale 46 from which a reading may be obtained. The reading scale is preferably fixed with respect to post 18. The lower end of reading indicator 45 is integrally formed with a needle pivot rod 47, shown best in FIGURE 2, which is received in needle pivot blocks 48 and 49 mounted on weigh beam 11. A motion reflecting lever is indicated generally at 50, this lever also being formed integral with the needle pivot rod 47 so that the angle between the reading indicator 45 and the motion reflecting or multiplying lever 50 is fixed at all times. Lever 50 is threaded and receives an elongated collar 51 which has a necked-down portion 52 to which one end of a connecting member 53 may be secured. The connecting member may, if desired, be flexible since the weight of the lever and collar will maintain it under tension. More preferably, the connecting member may be a rigid rod pivoted at each end. The upper end of the connecting member is connected to an extension 54 which in turn is rigidly connected to the weigh bucket 21. If a bodily flexible member such as a wire is used for the connecting member 53 it must be non-elastic under the normal variations in environmental temperature. If a bodily rigid member is used it must be able to follow, with a minimum of friction, the movement of the weigh bucket 21.

In this instance a rigid extending member 54 to which the upper end of connecting member 53 is secured has been illustrated, but the use of such an extension member is not a necessity. It might for example be feasible to connect the connecting member directly to the weigh bucket 21, depending on the configuration of the weigh bucket.

It should also be understood that the reading or multiplying indicator 45 is shown as pivoted about a pivot point which is located substantially vertically above the pivot 12 of the weigh beam 11. This is desired for maximum accuracy, although it may be convenient depending upon structural arrangements and other modifications to displace the pivot rod 47 slightly out of alignment with the beam pivot 12. Similarly, the motion multiplying lever 50 is shown as pivoted about the same pivot as is the reading indicator 45. Again, under certain conditions it may be desirable to offset the pivots for these two levers slightly but for greatest accuracy it is desirable that both levers rotate about a common pivot. Finally, the particular angle at which the reading indicator and motion multiplying reader are disposed is not particularly critical. In most instances it will be convenient to provide an upwardly extending reading indicator with a reading scale 46 at approximately eye level for ease in reading. The reading scale need not be located in this position and its precise location is a matter of convenience. It is only necessary that the angular relationship of the reading indicator 45 to the adjusting lever 50 be maintained substantially constant at all times.

A swing type weight compensator is indicated generally at 55. Since the present invention can be utilized in a weighing apparatus which does not employ the swing weight compensator, it is not further described. For a more complete description of its components and mode of operation reference is made to the aforesaid copending application.

The use and operation of the invention is as follows:

The balance indicator assembly 44 may be employed with the scale beam weight 19 to establish an initial weight setting. This involves manipulations more completely described in the aforesaid copending application. After an initial setting is established an operator is able to quickly visually determine if the weight batches are within their permissive tolerances.

Material is discharged from screw conveyor 31 through chute 33 by manipulation of gate 37 which is controlled by solenoid 40 and suitable linkage. As the material to be weighed is deposited in weigh bucket 21 the weigh beam 11 will move from an initial position in which it is inclined upwardly to the right as viewed in FIGURE 1 to the illustrated FIGURE 1 position. As the weigh bucket 21 descends motion multiplying lever 50 likewise descends, the upper and lower ends of the connecting means 53 moving identical distances downwardly for all practical purposes. Actually the lower end of connecting means 53 may describe a slight arc but for all practical purposes it may be considered that the length of the chord of the arc will be identical to the length of travel of the upper end of connecting means 53.

Since reading indicator 45 is integral with respect to motion multiplying lever 50, the arc of swing of the reading indicator will be identical with the arc of swing of the motion multiplying lever 50. However, since the reading indicator 45 is substantially longer than the motion multiplying lever 50, the travel of the upper end of this reading indicator will be greater than the travel of the end of the motion multiplying lever by a ratio of the length of lever 45 to lever 50.

A small, barely perceptible, movement of the motion multiplying lever 50 past the point of exact balance will be magnified several times by reading indicator 45 and a deviation or deflection from the zero point will be quickly apparent from the expanded scale 46.

It may under some circumstances be desirable to change the ratio of the lengths of the reading indicator to the length of the motion multiplying lever. This is quickly and easily accomplished by rotating the collar 51 in the appropriate direction, clockwise rotation effectively shortening lever 50 and multiplying the movement effect, and counter-clockwise movement of collar 51 having the opposite effect.

Although a preferred embodiment of the invention has been disclosed and described, it will at once be apparent to those skilled in the art that other modifications may be made by those skilled in the art without departing from the spirit and scope of the invention. Accordingly it is the intention that the invention be limited not by the foregoing exemplary description but solely by the hereafter appended claims when interpreted in light of the pertinent prior art.

I claim:

1. A balance indicator assembly for use in a weighing apparatus having a pivoted beam which supports a material receiving receptacle, said balance indicator assembly including, in combination,
   a reading indicator, said reading indicator being carried by and movable with respect to the beam,
   a lever, said lever being fixed with respect to and thereby movable with, the reading indicator,
   said reading indicator and lever being rotatable about a common pivot carried by the beam
   said reading indicator and lever being mounted for pivotal movement about an axis which is substantially vertically aligned with the pivoted beam axis,
   the radial length of the reading indicator being longer than the radial length of the lever when measured from the common pivot, and
   means connecting the lever directly to the material receiving receptacle to thereby support the lever from the material receiving receptacle whereby movement of the lever is under the direct influence of movement of the material receiving structure,
   said connecting means being movable with the receptacle whereby movement of the receptacle is transmitted to and magnified by the reading indicator,
   said connecting means being disposed at a base angle when the reading indicator is at zero deflection, and being so positioned as to remain substantially parallel to its base angle position throughout at least substantially its entire range of movement.

2. The balance indicator assembly of claim 1 further characterized in that the connecting means is positioned substantially vertical when the reading indicator is at the position of zero deflection.

3. The balance indicator assembly of claim 2 further including an extension member rigidly fixed to and movable with the weighing receptacle, said extension member being located in a position substantially directly above the lever in all relative positions of the receptacle to the weigh beam whereby the connecting means is disposed substantially vertical at all times.

4. In combination in a weighing system,
   a pivoted weigh beam assembly having a load receiving structure, and
   an independent balance indicator assembly for use with said pivoted weigh beam assembly,
   said independent balance indicator assembly being associated with, but functionally substantially independent of, the weigh beam assembly whereby substantially no stray forces attributable to the balance indicator assembly are imposed on the weighing action as the position of the weigh beam assembly or the balance indicator assembly changes,
   said balance indicator assembly including,
   a reading indicator mounted for pivotal movement on structure having a pivot axis substantially vertically aligned with the weigh beam assembly pivot,
   a motion reflecting lever connected to the reading indicator at a fixed angle, and
   means connected directly between the load receiving structure and the motion reflecting lever for translating motion of the weigh beam assembly to the motion reflecting lever whereby said motion will be multiplied by, and a reading obtainable from, the reading indicator.

5. The weighing system of claim 4 further characterized in that the reading indicator and lever are disposed substantially at right angles to one another.

6. The weighing system of claim 4 further characterized by and including means associated with the reading indicator and lever for varying the length ratio between the reading indicator and the lever.

7. The weighing system assembly of claim 4 further characterized in that the common pivot is located, during periods of zero deflection of the reading indicator, in substantially vertical alignment with the beam pivot.

References Cited by the Examiner

UNITED STATES PATENTS

| 766,777 | 8/1904 | Stimpson | 177—248 |
| 2,549,190 | 4/1951 | Gilchrist | 177—173 |

FOREIGN PATENTS

| 240,013 | 9/1925 | Great Britain. |
| 292,571 | 1/1932 | Italy. |

LEO SMILOW, *Primary Examiner.*